US010992703B2

(12) United States Patent
Swanson et al.

(10) Patent No.: US 10,992,703 B2
(45) Date of Patent: Apr. 27, 2021

(54) FACET WHITELISTING IN ANOMALY DETECTION

(71) Applicant: Malwarebytes Inc., Santa Clara, CA (US)

(72) Inventors: Douglas Stuart Swanson, Holmfirth (GB); Mina Yousseif, Clearwater, FL (US); Jon-Paul Lussier, Jr., Spring Hill, FL (US)

(73) Assignee: Malwarebytes Inc., Santa Clara, CA (US)

( * ) Notice: Subject to any disclaimer, the term of this patent is extended or adjusted under 35 U.S.C. 154(b) by 5 days.

(21) Appl. No.: 16/292,307

(22) Filed: Mar. 4, 2019

(65) Prior Publication Data

US 2020/0287914 A1 Sep. 10, 2020

(51) Int. Cl.
H04L 29/06 (2006.01)
G06F 16/13 (2019.01)
G06F 16/28 (2019.01)

(52) U.S. Cl.
CPC .......... H04L 63/145 (2013.01); G06F 16/137 (2019.01); G06F 16/285 (2019.01); H04L 63/101 (2013.01)

(58) Field of Classification Search
None
See application file for complete search history.

(56) References Cited

U.S. PATENT DOCUMENTS

| 5,440,723 | A | | 8/1995 | Arnold et al. | |
|---|---|---|---|---|---|
| 5,452,442 | A | * | 9/1995 | Kephart | G06F 21/564 713/188 |
| 6,263,348 | B1 | * | 7/2001 | Kathrow | G06F 9/44505 |
| 7,334,005 | B2 | | 2/2008 | Sobel | |
| 7,814,545 | B2 | * | 10/2010 | Oliver | H04L 51/12 726/22 |
| 7,873,996 | B1 | * | 1/2011 | Ennigh | H04L 51/12 726/22 |
| 8,074,115 | B2 | | 12/2011 | Stolfo et al. | |
| 8,108,929 | B2 | | 1/2012 | Agrawal et al. | |
| 8,533,824 | B2 | * | 9/2013 | Hutton | G06F 21/565 726/22 |
| 8,584,235 | B2 | * | 11/2013 | Topan | G06F 21/563 726/22 |
| 8,607,066 | B1 | * | 12/2013 | Kailash | H04L 63/1441 713/188 |
| 9,104,872 | B2 | * | 8/2015 | Zhou | G06F 21/566 |
| 9,292,689 | B1 | * | 3/2016 | Chuo | H04L 63/145 |

(Continued)

FOREIGN PATENT DOCUMENTS

CN 103369555 A 10/2013

*Primary Examiner* — Jeffrey Nickerson
*Assistant Examiner* — Vadim Savenkov
(74) *Attorney, Agent, or Firm* — Fenwick & West LLP

(57) ABSTRACT

A security server receives a full hash and a set of subhashes from a client. The security server determines that the full hash is whitelisted. The security server updates, for each subhash in the set of subhashes, an associated clean count. The security server adds a subhash to a subhash whitelist responsive to an associated clean count exceeding a threshold. The security server receives a second set of subhashes. The security server determines whether at least one of the subhashes in the second set of subhashes is included in the subhash whitelist. The security server reports to the client based on the determination.

20 Claims, 5 Drawing Sheets

(56) References Cited

U.S. PATENT DOCUMENTS

| | | | |
|---|---|---|---|
| 9,298,920 B1 | 3/2016 | Mason et al. | |
| 9,319,423 B2 | 4/2016 | Jover et al. | |
| 9,430,646 B1 | 8/2016 | Mushtaq et al. | |
| 9,805,115 B1 | 10/2017 | Satish | |
| 10,162,967 B1* | 12/2018 | Oliver | G06F 21/57 |
| 2005/0108562 A1 | 5/2005 | Khazan et al. | |
| 2005/0229254 A1* | 10/2005 | Singh | G06F 21/55 |
| | | | 726/23 |
| 2006/0036693 A1* | 2/2006 | Hulten | H04L 51/12 |
| | | | 709/206 |
| 2008/0022106 A1* | 1/2008 | Singh | H04L 63/1416 |
| | | | 713/176 |
| 2009/0158430 A1 | 6/2009 | Borders | |
| 2011/0138465 A1* | 6/2011 | Franklin | G06F 21/552 |
| | | | 726/23 |
| 2011/0185417 A1* | 7/2011 | Zhou | G06F 21/566 |
| | | | 726/22 |
| 2011/0202998 A1* | 8/2011 | Dullien | G06F 21/564 |
| | | | 726/24 |
| 2011/0219447 A1* | 9/2011 | Horovitz | G06F 9/45533 |
| | | | 726/22 |
| 2012/0174227 A1 | 7/2012 | Mashevsky et al. | |
| 2013/0145471 A1 | 6/2013 | Richard et al. | |
| 2014/0157405 A1* | 6/2014 | Joll | H04L 63/1425 |
| | | | 726/22 |
| 2014/0283066 A1 | 9/2014 | Teddy et al. | |
| 2015/0220735 A1 | 8/2015 | Paithane et al. | |
| 2015/0326601 A1 | 11/2015 | Grondin et al. | |
| 2016/0366158 A1 | 12/2016 | Feng et al. | |
| 2016/0381041 A1 | 12/2016 | Bean et al. | |
| 2016/0381042 A1 | 12/2016 | Zhang | |
| 2017/0006045 A1 | 1/2017 | Kivva et al. | |
| 2017/0048199 A1* | 2/2017 | Hutton | G06F 21/51 |
| 2017/0085585 A1 | 3/2017 | Morkovsky | |
| 2017/0300691 A1* | 10/2017 | Upchurch | G06F 21/563 |
| 2018/0081991 A1* | 3/2018 | Barber | H04L 63/1441 |

* cited by examiner

FACET WHITELISTING IN ANOMALY DETECTION

FIELD OF ART

The present disclosure generally relates to preventing malware and more specifically to reducing false positives in malware detection.

BACKGROUND

It is traditionally difficult to automatically detect malware due to the constantly evolving nature of different types of malware. Conventional detection techniques often suffer from a high rate of false positives in which clean files are erroneously detected as malware. False positives are undesirable because they may prompt an anti-malware application to unnecessarily quarantine or delete important system or user files.

SUMMARY

A method determines whether files are whitelisted. A first full hash and a first set of subhashes are received from a client. The first full hash is a hash of a first file and each subhash in the first set of subhashes is a hash of a facet of the first file. A facet is a non-code portion of a file. It is determined whether the first full hash is whitelisted. Responsive to determining the first full hash is whitelisted, for each subhash in the first set of subhashes, an associated clean count is updated. Each clean count tracks a historic number of whitelisted files with which the subhash is associated. Responsive to a first clean count of the clean counts exceeding a threshold clean count, the subhash associated with the first clean count is added to a subhash whitelist.

A second full hash and a second set of subhashes are received from the client. The second full hash is a hash of a second file and each subhash in the second set of subhashes is a hash of a facet of the second file. It is determined whether the second full hash is whitelisted. Responsive to determining the second full hash is not whitelisted, it is determined whether at least one subhash in the second set of subhashes is included in the subhash whitelist. Responsive to determining that at least one subhash in the second set of subhashes is included in the subhash whitelist, the second file is determined to be whitelisted. It is reported to the client that the second file is whitelisted.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A protection application classifies files on a client and remediates files classified as malware. As part of the classification, the protection application may send a full hash of one or more files to a security server to check whether the files are included in a file whitelist. If the full hash of a file is included in the whitelist, the security server informs the protection application that the file is clean. If the full hash is not included in the whitelist, the security server checks whether one or more hashes of facets of the file ("subhashes") are included in a subhash whitelist. If so, the security server reports the file as clean to the protection application. Otherwise, if the file and its facets are unknown to the security server, the protection application may determine how to classify the file based on a file classification model. The subhash whitelist may beneficially be automatically updated over time using a learning technique that learns which facets are representative of clean files and may be added to the subhash whitelist, and which facets may be associated with malware and should be removed from the subhash whitelist.

Figure 1:
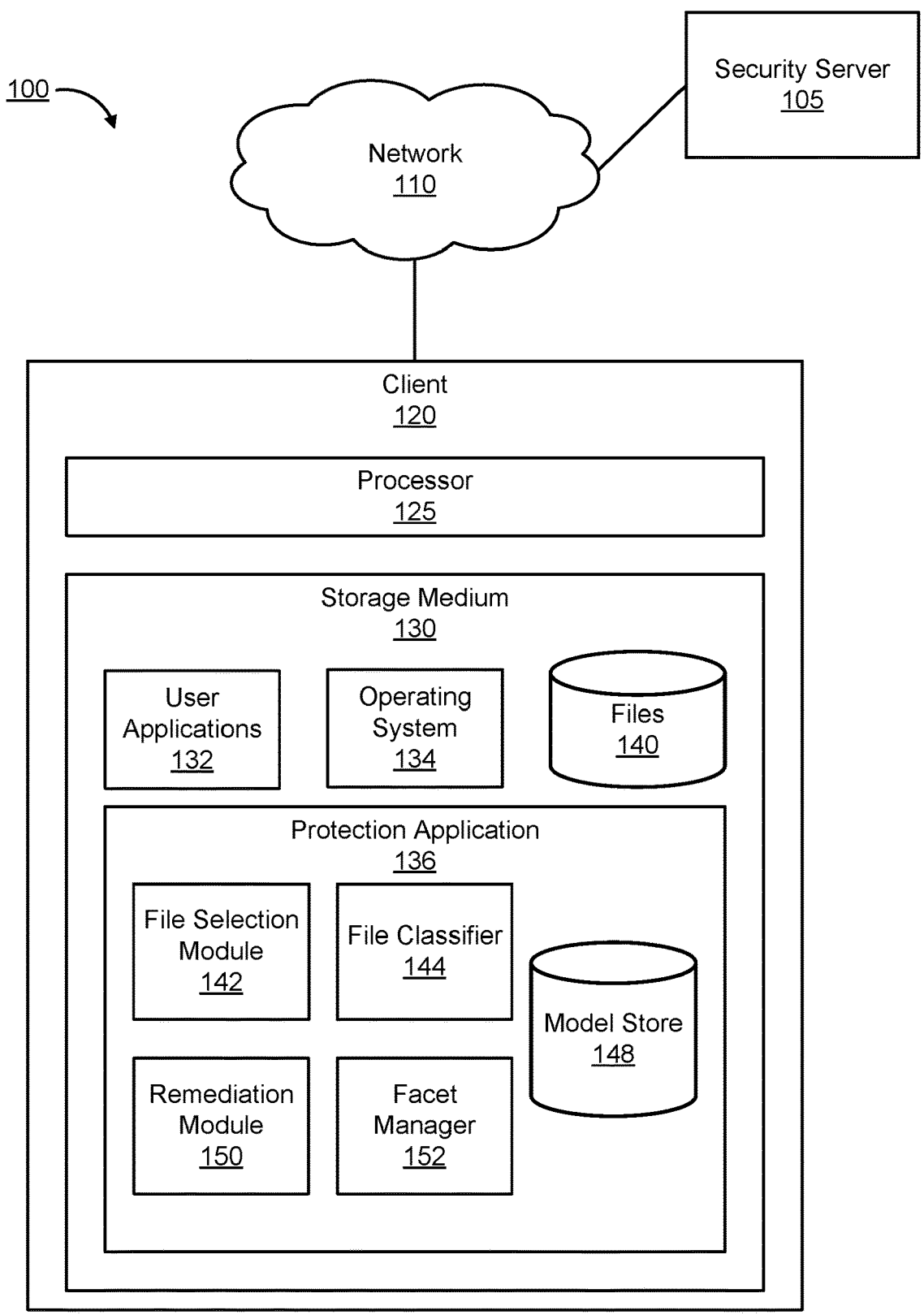
FIG. 1 is a system diagram illustrating an example embodiment of an environment in which a protection application and a security server execute.

FIG. 1 is a high-level block diagram illustrating a system environment 100 for a protection application and a security server. The system environment 100 comprises a security server 105, a network 110, and a client 120 (also referred to as a client device 120). For simplicity and clarity, only one security server 105 and one client 120 are shown; however, other embodiments may include different numbers of security servers 105 and clients 120. Furthermore, the system environment 100 may include different or additional entities.

The security server 105 is a computer system configured to store, receive, and transmit data to clients 120 or to other servers via the network 110. The security server 105 may include a singular computing system, such as a single computer, or a network of computing systems, such as a data center or a distributed computing system. The security server 105 may receive requests for data from clients 120 and respond by transmitting the requested data to the clients 120. The security server 105 includes a database of information about known malware (e.g., a blacklist), clean files (e.g., a whitelist), or both. Further, the security server 105 may lookup files in whitelists or blacklists of the database and provide results of the lookup to clients 120. The security server 105 is described in further detail below with reference to FIG. 3.

The network 110 represents the communication pathways between the security server 105 and clients 120. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client 120 may be a desktop computer, a laptop computer, a mobile phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, and external memory storage devices. In addition to storing program instructions, the storage medium 130 stores files 140, as well as various data associated with operation of the operating system 134, protection application 136, and other user applications 132.

In one embodiment, the storage medium 130 comprises a non-transitory computer-readable storage medium. Various executable programs (e.g., operating system 134, protection application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. For example, a computer's operating system 134 may manage the processor 125, storage medium 130, or other components not illustrated such as, for example, a graphics adapter, an audio adapter, network connections, disc drives, and USB slots. A mobile phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the user. Examples of user applications 132 may include a word processor, a spreadsheet application, and a web browser. In some cases, a user application 132 can be a source of malware and may be associated with one or more of the files 140 stored on the client 120. The malware may be executed or installed on the client 120 when the user application 132 is executed or installed, or when an associated malicious file is accessed.

The protection application 136 detects and remediates potentially malicious files installed or otherwise stored on the client 120. To determine whether a given file is potentially malicious, the protection application 136 generates an anomaly score for the given file that represents a measure of dissimilarity between the given file and known clean files. Files that are highly anomalous relative to the clean files (e.g., have an anomaly score exceeding a predefined threshold) are identified as being potentially malicious. The protection application 136 may also access the security server 105 via the network 110 to perform a check of a file against one or more whitelists of known clean files and/or blacklists of known malware prior to classifying the file as being malicious or clean and taking appropriate remedial action, if necessary.

The protection application 136 includes a file selection module 142, a file classifier 144, a model store 148, a remediation module 150, and a facet manager 152. Alternative embodiments may include different or additional modules or omit one or more of the illustrated modules.

The file selection module 142 selects files for classification by the protection application 136. The file selection module 142 may execute, for example, during a scheduled scan of the storage medium 130 or upon downloading files to the storage medium 130 to determine whether or not to further analyze particular files for potential malware. The file selection module 142 obtains metadata associated with a given file from the files 140 on the client 120. The metadata includes a set of information that describes the given file. For example, the metadata may include file header information indicating a file format (e.g., a file having a portable executable (PE) format, portable document format (PDF), image format, another type of executable format, etc.), file size, file location, file source, or other parameters. In some embodiments, the file selection module 142 stores content of the given file into a buffer and obtains the metadata by parsing the contents from the buffer. The file selection module 142 may use the obtained metadata to determine a subclass of the given file. The subclass is a label with which the file selection module 142 may assign or tag the given file based on its metadata. Example subclasses of file types include portable executables (e.g., files with the .exe extension, dynamic-link libraries (DLL), and drivers), documents (e.g., files with extensions such as .doc, .docx, .txt, etc.), PDFs, images, scripts (e.g., JavaScript (.js), Visual Basic Scripts (.vbs), WINDOWS® script files (.wsf), etc.), among other types of files. The protection application 136 may use the assigned subclass for other classification steps further described below.

Additionally, the file selection module 142 may apply one or more filters to filter out files that can be deemed harmless without further processing and to select files for further processing. In an embodiment, different filters may be applied to different files depending on the determined file subclass. For example, the file selection module 142 may include different filters each associated with different file subclasses and may use the obtained subclass (or unprocessed metadata) to select a filter to apply each given file. Alternatively, a plurality of different filters may be applied to all input files, with each filter designed to filter the files in different ways. For instance, a first filter for executable-type files may filter files according to different filtering criteria than a second filter for non-executable-type files. The filtering criteria for each filter may be based on a local whitelist of known clean files stored by the protection application 136. Here, each filter passes files that do not match any of the known clean files on the respective whitelist associated with the filter. In other embodiments, a filter may filter out (or pass) files based on criteria such as whether or not a file is digitally-signed, has file size in a target range, includes structured exception handling information, or was previously classified as clean by the protection application 136. Only the files that pass through the filter are further processed for potential classification as being malicious, as further described below. Filtering the files 140 may be advantageous because, by reducing the number of files passed down the pipeline for further processing, the protection application 136 may reduce the amount of computational resources required by the client 120 for classification. In an embodiment, only a relatively small percentage of files pass through the filter.

The facet manager 152 identifies and extracts facets from files, e.g. files selected by the file selection module 142, and hashes the extracted facets to generate respective subhashes. Here, a facet comprises a portion of a file that represents particular characteristics of the file that may be indicative of whether or not the file is malware. In an embodiment, a facet comprises a non-code portion of a file. For example, a facet may include an author string, a product name string, a list of application programming interfaces (API's) used by the file, a description of the file, copyright information, details from a file header of the file, or a combination thereof. A subhash of a facet is a hash computed on the facet.

The facet manager 152 analyzes files to identify one or more facets. For example, based on the file type, the facet manager 152 may identify a header schema corresponding to the file type, and use the header schema to identify different sections of the header of the file for extraction as facets. The facet manager 152 may generate an index that stores the subhashes computed from the facets of a file in association with a full hash of the file, such that the subhashes may be retrieved in response to a query with the full hash. Depending upon the embodiment, either the file selection module 142, the facet manager 152, or the file classifier 144 hashes the file into the full hash.

The model store 148 stores a plurality of anomaly score models used by the file classifier 144 to classify files as malicious or clean. Each anomaly score model comprises a function that generates an anomaly score based on a set of input features (e.g., an input feature vector) derived from an input file and a set of model parameters. The features are measurable properties of files that characterize the files in a way that enables similarities or dissimilarities between files to be measured. Features may be properties represented by a numerical scale such as a checksum value of a file, or binary properties such as whether the checksum value is valid. In one embodiment, features for a PE file, can include a number of writeable or executable non-header sections of the PE file, a number of unknown or uncommon sections, section characteristics, or an amount of resources allocated to certain sections. The features may also be based on heuristics such as whether the PE checksum is valid or whether a rich string is valid. In an embodiment, the rich string is a particular portion of a PE file header that may be ignored by an operating system 134 and, as a result, may be used by malware to store custom data such as decryption keys. In some embodiments, all of the features may be derived without executing the files, but instead by performing a static analysis of the files.

The model parameters for each model may be derived from reference features (e.g., reference feature vectors) associated with a set of reference files comprising known clean files. The model parameters may include, for example, a mean feature vector µ representing average values for each feature in the set of reference files, and a covariance matrix Σ representing the variance of each feature and the covariance between all feature pairs. In other words, the covariance matrix Σ represents or describes the spread of the data in the feature space.

The function computes an anomaly score that provides a measure of how anomalous (e.g., how dissimilar) the input file is from the set of known clean files based on their respective features. For instance, an anomaly score model may specify the following function to determine an anomaly score p(x) for a target file having a feature vector x, where n is the number of features employed by the model:

$$p(x) = \frac{1}{(2\pi)^{\frac{n}{2}}|\Sigma|^{\frac{1}{2}}} \exp\left(-\frac{1}{2}(x-\mu)^T \Sigma^{-1} (x-\mu)\right)$$

In this function, distances are determined between each feature of the input feature vector x and corresponding mean features of the mean feature vector and the distances are combined to generate the anomaly score p(x). The selected model generates the anomaly score based on the differences and the variances for the features of the file, so that the anomaly score may be normalized based on the variances, which may vary from file-to-file.

Each of the different models in the model store 148 may specify a different function, different parameters, or different features sets to which the function is applied. Each of the different models may be associated with a different subclass of files and may be configured specifically to detect anomalies within that file subclass. For example, the different models may be trained with reference files within a particular subclass so that the model produces an anomaly score relative to a particular subclass of files. In an embodiment, the model store 148 may receive new anomaly score models or periodic updates to existing anomaly score models from the security server 105. An example of a training module for training different models in the model store 148 is described in further detail below with respect to FIG. 3.

The file classifier 144 uses the obtained subclass of an input file to select one of the multiple anomaly score models suitable to score the input file. For example, the file classifier 144 selects a model associated with the subclass that corresponds to the assigned subclass of the input file to be scored. In one embodiment, the file classifier 144 generates features for the input file, and applies the selected model to the input file to generate the anomaly score, for example, by applying the function of the selected model to the features using the parameters (e.g., expected value and variances) of the selected model.

The file classifier 144 compares the anomaly scores against one or more threshold scores to classify the files. In one embodiment, the file classifier 144 classifies a file as malicious based on determining that an anomaly score for the file is greater than a threshold score, and clean otherwise. In order to reduce false positives associated with a classification based on the anomaly score alone, the file classifier 144 retrieves the full hash of the file and its associated subhashes from the index in the facet manager 152 and sends the full hash and subhashes to the security server 105, where they are checked against one or more whitelists and/or blacklists. The file classifier 144 then classifies the file based at least in part on results of the checks received from the security server 105. Depending upon the embodiment, the checks involve checking the full hash and/or the subhashes against one or more whitelists, one or more blacklists, or both. For example, if the anomaly score is above a threshold score, the full hash may be compared against a whitelist of full hashes. If no match is found, subhashes associated with facets of the file may be compared against a whitelist of subhashes. If a match is found on either whitelist, the file is determined to be clean despite the anomaly score. Otherwise, if neither the file hashes nor the facet subhashes match the respective whitelists, the file is classified as malicious. By checking against the cloud whitelist, the file classifier 144 may reduce the number of false positives (i.e., clean files erroneously classified as malicious) because, in some exceptions, clean files may not closely resemble other typical clean files and may have high anomaly scores despite being clean.

In an embodiment, when the anomaly score is below the threshold score, the file classifier may classify the file as clean without checking the whitelists at the security server 105. In an alternative embodiment, the file classifier may query a blacklist of the security server 105 in response to the anomaly score being below the threshold score. Here, the full hash is compared against a blacklist of full hashes and the file is classified as malicious if the full hash matches an entry in the blacklist and may otherwise be classified as clean. Optionally, a blacklist of subhashes associated with facets of the file may also be queried if no matches are found on the blacklist of full hashes, and the file may be determined to be malicious responsive to a match with a subhash in the blacklist of subhashes, and is otherwise classified as clean.

In another embodiment, multiple thresholds may be used (e.g., three thresholds including a lower threshold, a center threshold, and an upper threshold). Here, the file classifier 144 classifies a file as malicious responsive to determining that an anomaly score for the file is greater than (or equal to) an upper threshold score without querying whitelists or blacklists on the security server 105. On the other hand, the file classifier 144 classifies the file as clean responsive to determining that the anomaly score is less than a lower threshold score without querying whitelists or blacklists on the security server 105. Responsive to determining that the anomaly score is less than the upper threshold score and greater than (or equal to) a center threshold score, the file classifier 144 provides the file to the security server 105 for comparison against one or more whitelists known clean files and/or facets associated with malware as described above.

Optionally, the file classifier 144 may also provide the file to the security server 105 for comparison against one or more blacklists of known malware and/or facets associated with malware as described above.

In some use cases, the lower and upper threshold scores may be between one to three standard deviations below and above the center threshold score, respectively. The file classifier 144 may use the lower, center, or upper threshold scores to reduce load on the security server 105 by decreasing the amount of files that are provided to be checked by the security server 105.

The remediation module 150 remediates files that are classified as malicious by the file classifier 144. In particular, the remediation module 150 may perform remediation by removing a malicious file from the client 120, quarantining the malicious file on the client 120, or providing a notification to a user of the client 120 indicating that the malicious file is suspected to be associated with malware. The notification may also include information about the malicious file such as a file source or risk severity level proportional to the anomaly score of the malicious file. In one embodiment, the remediation module 150 provides a user of the client 120 with an option to remove or quarantine a suspected malicious file. Responsive to the user selecting to retain rather than remove the suspected malicious file, the remediation module 150 may determine that the classification is a false positive and provide this feedback to the security server 105 to re-train an anomaly score model.

Figure 2:
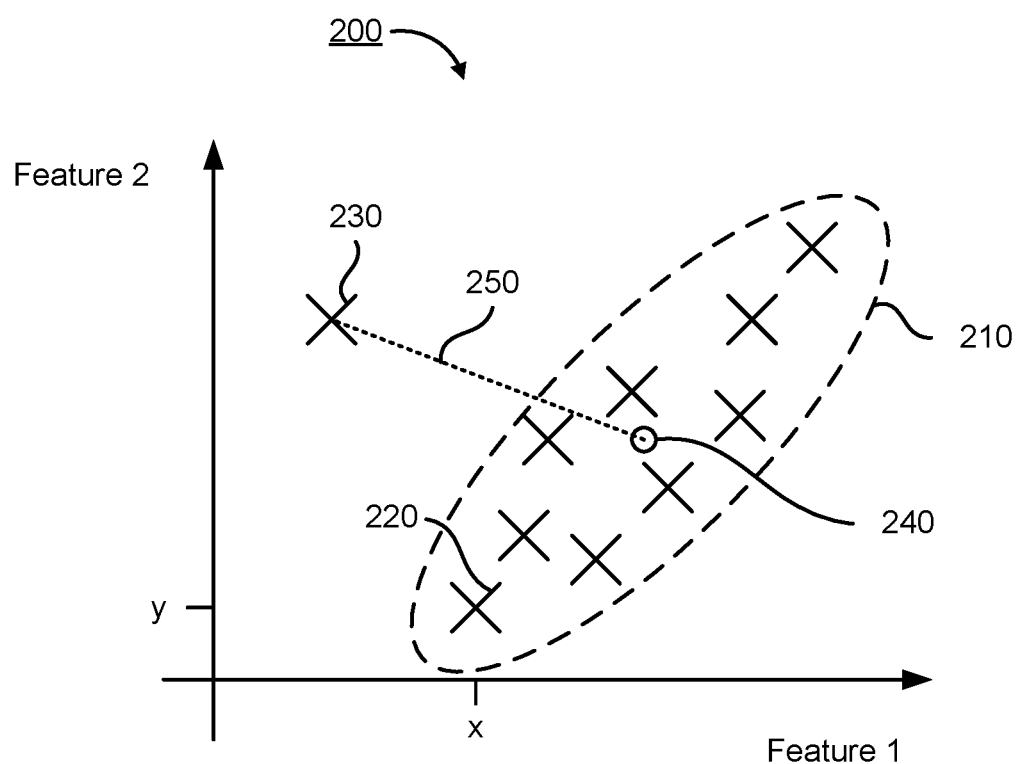
FIG. 2 is a diagram characterizing files that illustrates a process for generating anomaly scores, according to one embodiment.

FIG. 2 is a diagram 200 characterizing files that illustrates a process for generating anomaly scores, according to one embodiment. In the embodiment shown in FIG. 2, the diagram 200 includes a graph of points representing a sample of known clean files and a target file to be scored by an anomaly score model. To characterize the sample, features of the sample are represented by the two axes of the graph. In particular, the x-axis and y-axis represent feature 1 and feature 2, respectively, though in other embodiments, anomaly score models use many more features, e.g., hundreds of features. For each file of the sample, a multi-dimensional feature score is represented by a point on the graph. As an example, the point 220 corresponds to a file of the sample having a feature score of "x" for feature 1 and a feature score of "y" for feature 2. The points of the clean files of the sample are within dotted lines of the contour 210, illustrating that the clean files are generally similar (non-anomalous) to each other based on the characterized features. The contour 210 may represent the multivariate Gaussian distribution of the points of the sample, which is determined by the anomaly score model based on the feature scores.

The anomaly score may be represented in the graph as a distance 250 between the point 230 representing the target file and the mean 240 of the multivariate Gaussian distribution, or the "peak of normal." The mean 240 may be an average of one or more feature scores of the sample. As the distance 250 (also referred to as a Mahalanobis distance or a Euclidean distance) increases, the point 230 is a greater number of standard deviations away from the mean 240, thus indicating that the target file is more dissimilar to the sample. In this visualization of the anomaly score, a threshold of distance 250 may be the threshold at which a file is classified as anomalous.

The diagram 200 is used to illustrate conceptually how suspected malicious file may be distinguished from a sample of clean files. That is, the anomaly score models in the model store 148 do not necessarily use a graph having two axes, each representing a different feature, to determine anomaly scores. Rather, the anomaly score models may be implemented using known types of machine learning techniques or models such as decision trees, support vector machines (SVMs), neural networks (e.g., autoencoders), boosted/bagged ensemble models, isolation forests, and the like. Additionally, the anomaly score models may characterize any number of features of the sample, e.g., hundreds of different features.

Figure 3:
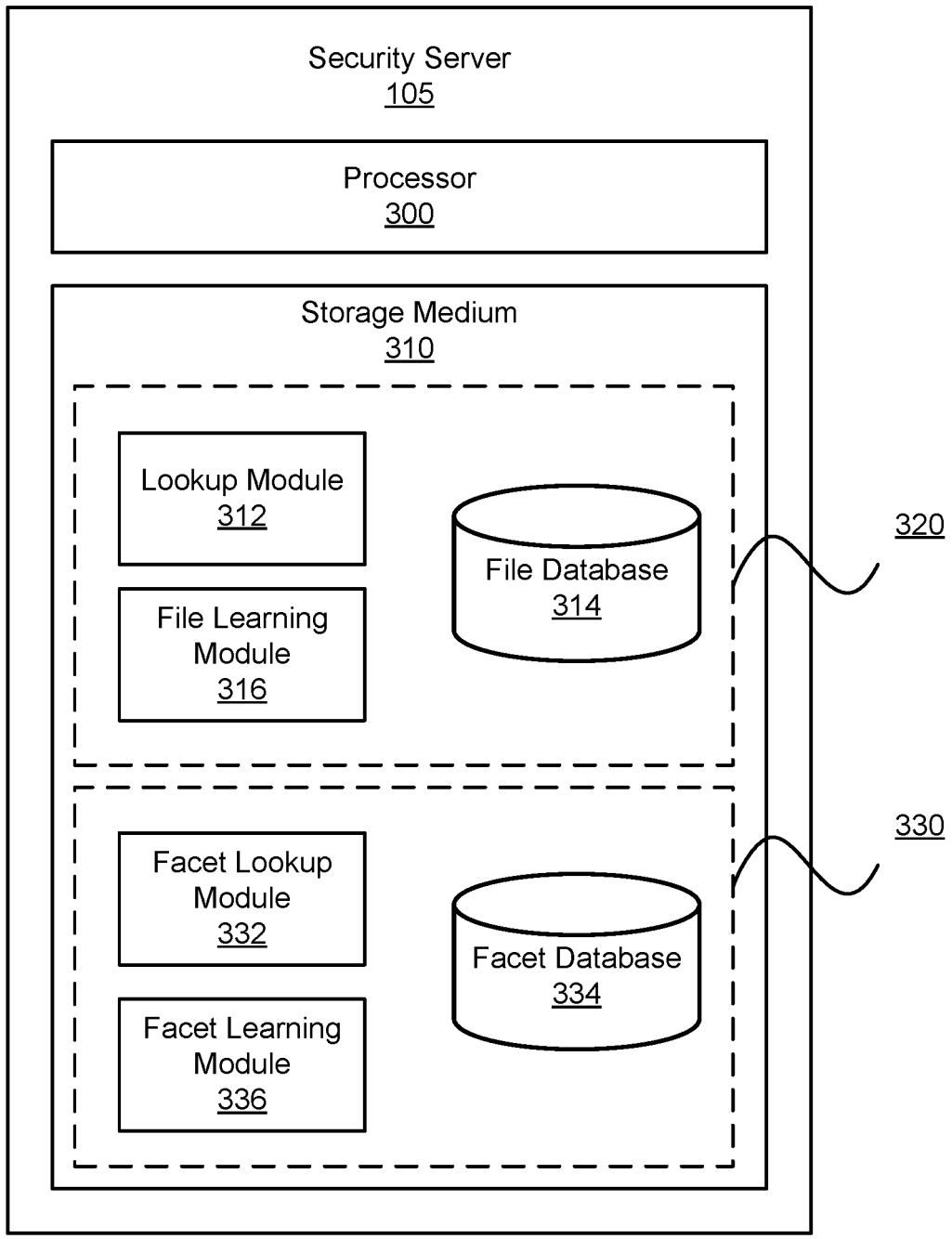
FIG. 3 is a block diagram illustrating an example embodiment of a security server.

FIG. 3 is a block diagram illustrating an example embodiment of a security server 105. The security server 105 includes a processor 300 for manipulating and processing data, and a storage medium 310 for storing data and program instructions associated with various modules. The storage medium 310 includes a lookup module 212, a file database 214, and a file learning module 316 which collectively form a file analysis system 220. The storage medium 310 additionally includes a facet lookup module 232, a facet database 234, and a facet learning module 236, which collectively form a facet analysis system 230. Alternative embodiments may include different or additional modules or omit one or more of the illustrated modules.

The lookup module 312 checks full hashes against a whitelist and/or blacklist stored to the file database 314 based on information received from the file classifier 144 of the protection application 136 running on the client 120. In one embodiment, the file database 314 stores full hashes of files and the lookup module 312 compares a received full hash against the full hashes in the file database 314 to determine if they match. Alternatively, the file database 314 may store full files and the lookup module 312 may compare the full files against the files in the file database 314 to identify a match. For each file, the lookup module 312 performs a lookup in the file database 314 to determine if the full hash of the file is associated with information about known malicious files (e.g., related to malware) or clean files. The lookup module 312 provides a result of the lookup to the file classifier 144, e.g., via the network 110. The result may indicate that the full hash is associated with a full hash of a known malicious file on a blacklist, the full hash is associated with a full hash of a known clean file on a whitelist, or the full hash is not associated with full hashes of files on either the cloud blacklist or whitelist. The whitelist and/or blacklist in the file database 314 may include a more extensive database of full hashes of files than the previously described local whitelist and/or blacklist of the file selection module 142 on the client 120.

The file learning module 316 may establish training sets of clean files and learn model parameters for a plurality of different models each corresponding to a different file subclass. For example, the training set may obtain metadata for clean files and group the clean files into training sets of separate classes based on the metadata as described above. The file learning module 316 generates features for the files in each training set. The type or number of features may be different in each training set corresponding to a different class. For each class, the file learning module 316 trains a separate anomaly score model to learn model parameters using the features derived from the clean files in the training set for the class. Thus, each model may be configured to generate an anomaly score for an input file of a different file class, based on clean files of the same subclass as the input file.

In an example using subclasses that correspond to the file sources of files, a first model may be trained using a sample of files downloaded from an online server file source (and thus assigned to a first subclass), while a second model is trained using another sample of files obtained from a local disk file source on clients 120 (and thus assigned to a second subclass different than the first subclass). Thus, the first model may generate more accurate anomaly scores for files downloaded from the online server than for files obtained from the local disk, and vice-versa for the second model, because the features of each model are customized for different file sources.

In an example, the file learning module 316 uses the following equations to determine the model parameters including an expected value (i.e., mean) $\mu$ and covariance matrix $\Sigma$:

$$\mu = \frac{1}{m}\sum_{i=1}^{m} x^{(i)}$$

$$\sum = \frac{1}{m}\sum_{i=1}^{m}(x^{(i)} - \mu)(x^{(i)} - \mu)^T$$

where $x^{(i)}$ is a vector representing the set of features for a sample clean file i in the training set of m files and has a dimension equal to the number of features. The mean feature vector $\mu$ represents average feature scores for each of the features across the training set. Further, the covariance matrix $\Sigma$ represents the variance of each feature and the covariance between all feature pairs (i.e., extending across multiple dimensions), and may also capture how pairs of features vary together.

The file learning module 316 may optimize the model parameters in each model by applying the model to one or more test files known to be malicious or clean files. The performance of the model can be measured based on correct classifications of malicious test files and a number of false positives (e.g., classification of clean test files as malicious). Model parameters, the selected function, or the feature sets used in each model may then be adjusted to improve performance.

The file learning module 316 may distribute the trained models to protection applications 136 of clients 120, as well as periodically update the distributed models. Beneficially, since clean files generally experience slower rates of change than do malicious files, the anomaly score models do not need to be frequently re-trained with updated samples of clean files.

The facet analysis system 330 checks whether a file is clean and/or malicious based on its facets by checking the subhashes of the facets against a subhash whitelist and/or subhash blacklist. In one embodiment, the facet analysis system 330 solely checks whether the file is clean based on its facets by checking subhashes of the facets against a whitelist of subhashes stored at the facet database 334 and does not employ a blacklist associated with facets. Alternatively, the facet analysis system 330 may additionally or alternatively check whether the file is malicious based on its facets by checking subhashes of the facets against a blacklist of subhashes stored at the database 234.

The facet analysis system 330 additionally tracks the presence of subhashes in whitelisted and/or blacklisted files to learn which subhashes are associated with clean files and which subhashes are associated with malware. The subhash whitelist and/or subhash blacklist may be updated dynamically as new associations are learned.

The facet analysis system 330 thus provides an additional way of whitelisting clean files in order to reduce false positives that may be undetected by the file analysis system 220. By using the file analysis system 320 and the facet analysis system 330 in combination, the security server 105 can enable file classification that beneficially reduces the rate of false positives. Similarly, a facet blacklist, if employed, may reduce rates of false negatives.

The facet lookup module 332 checks subhashes against the facet database 334 based on information received from the file classifier 144 of the protection application 136 running on the client 120. The received information includes one or more subhashes, e.g., subhashes of facets identified by the facet manager 152 of the protection application 136 and included with the full hash received by the security server 105. For each subhash, the facet lookup module 332 performs a lookup in the facet database 334 to determine if the subhash is associated with information about known clean files and therefore matches a subhash on a subhash whitelist. In an embodiment, the facet lookup module 332 additionally or alternatively performs a lookup in the facet database 334 to determine if the subhash is associated with information about known malicious files and therefore matches a subhash on a facet blacklist.

The facet database 334 includes a subhash whitelist including subhashes of facets associated with files known to be clean. The facet database 334 may additionally or alternatively include a subhash blacklist including subhashes associated with files known to be malicious. If a subhash is included in the subhash whitelist, then the file associated with the subhash is determined to be clean. In an embodiment, if a subhash is included in the subhash blacklist, then the file is considered to be malicious. If no subhash of a file is included in the subhash whitelist, the security server 105 indicates that the subhashes were not in the whitelist to the protection application 136, which may then classify the file using other information, such as the anomaly score alone. As described below, the facet learning module 336 determines whether a subhash is included in the subhash whitelist, and in some embodiments, the subhash blacklist. In some embodiments, the facet analysis system 330 includes solely a subhash whitelist or a subhash blacklist, in which case the analysis corresponding to the other is not performed.

Based on the results of the lookups for the one or more subhashes, the facet lookup module 332 provides an indication to the file classifier 144, e.g., via the network 110, of whether at least one subhash was included in a subhash whitelist, and in some embodiments, whether at least one subhash was included in a subhash blacklist. In an embodiment, if one subhash is in the subhash whitelist, the facet lookup module 332 indicates to the file classifier 144 that the file is whitelisted. Alternatively, there may be a threshold number of subhashes that need to be clean (e.g., found in the subhash whitelist) in order for the file to be classified as clean by the facet lookup module 232.

The facet learning module 336 dynamically updates the subhash whitelist and/or subhash blacklist based on file classifications of files having facets associated with the subhashes. The facet database 334 maintains for each subhash of a facet, a clean count and a malicious count. The clean count of a subhash is a count indicating a number of known clean files that have been observed to include the facet associated with the subhash. The malicious count is a count indicating a number of known malicious files that have been observed to include the facet associated with the subhash. The facet learning module 336 updates the clean count and malicious count of each subhash as the security server 105 receives subhashes for facets and associated file hashes for a file, and determines whether the file is malware or clean. For example, each time the security server 105 determines that a file is clean, the clean count of each subhash of a facet included in the file is incremented by one by the facet learning module 236. Similarly, if the security server 105 determines that a file is malicious, the security server 105 increments by one the malicious count of each subhash of each facet in the file. In an embodiment, the security server 105 updates clean counts and/or malicious counts based on information received from a third party server (e.g., a third party security analysis system) that provides a determination of whether a file is clean or malicious.

The facet learning module 336 updates the subhash whitelist and, in some embodiments, the subhash blacklist, based on the clean counts and the malicious counts. If the malicious count of a subhash is nonzero, the facet learning module 336 may add the subhash to the subhash blacklist, and remove it from the subhash whitelist if it was included therein. If the clean count of a subhash is at least a threshold clean count value and the malicious count is zero, the facet learning module 336 adds the subhash to the subhash whitelist. The threshold clean count value may vary depending upon the embodiment. For example, the threshold clean count value may be three, or five, or another value.

In this manner, the facet learning module 336 enables the security server 105 to maintain up to date subhash whitelists and, in some embodiments, subhash blacklists, that accurately reflect which subhash are likely clean and/or malicious. As the validity of classifications made by the security server 105 are correlated with the validity of the whitelists and blacklists maintained by the security server 105, the facet learning module 336 enables the security server 105 to better guarantee that a classification of a file is correct.

Figure 4:
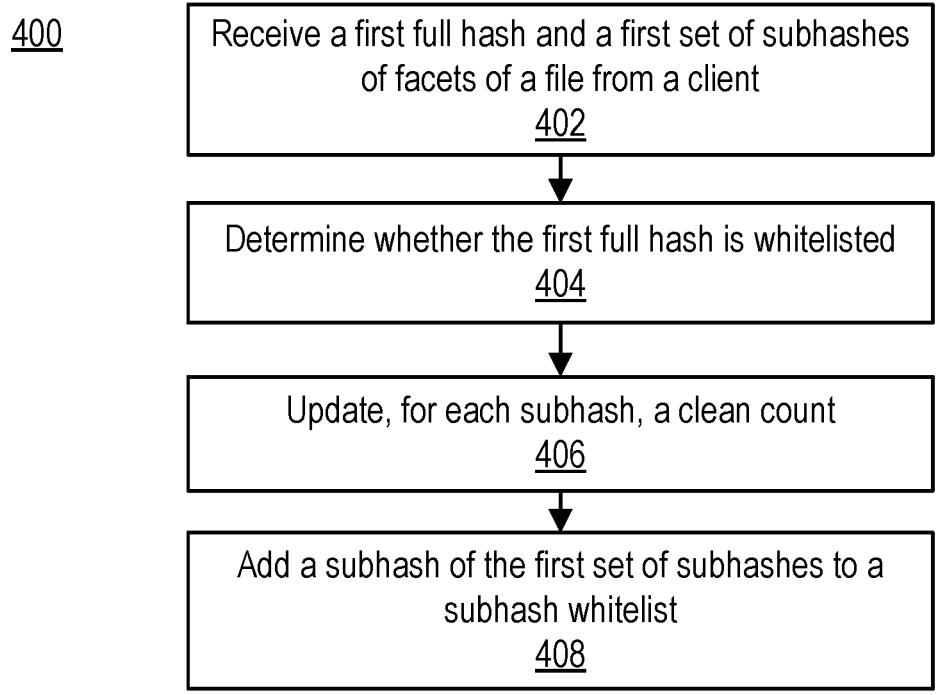
FIG. 4 is a flowchart illustrating an embodiment of a process for classifying files based on facets.

FIG. 4 is a flowchart illustrating an embodiment of a process 400 by a security server 105 for automatically updating a subhash whitelist associated with facets of files. The security server 105 receives 402 a first full hash of a file and a first set of subhashes of facets of the file from a protection application 136 at a client 120. The security server 105 determines 404 whether the first full hash is whitelisted, and if so, the security server 105 updates 406, for each subhash in the first set of subhashes received in association with the full hash for the file, a clean count associated with the subhash. The security server 105 adds 408 a subhash to a subhash whitelist responsive to the clean count associated with the subhash exceeding a threshold clean count. If the security server 105 determines the file is malware, the security server 105 removes the subhash from the subhash whitelist if present, regardless of its clean count. In an embodiment, the security server 105 maintains a malicious count for each subhash. The security server 105 increments the malicious count of each subhash associated with the file responsive to the determining the file is malware, and removing a subhash from the whitelist is responsive to the malicious count being nonzero. The security server 105 may then report the results of the determination to the client 120.

Figure 5:
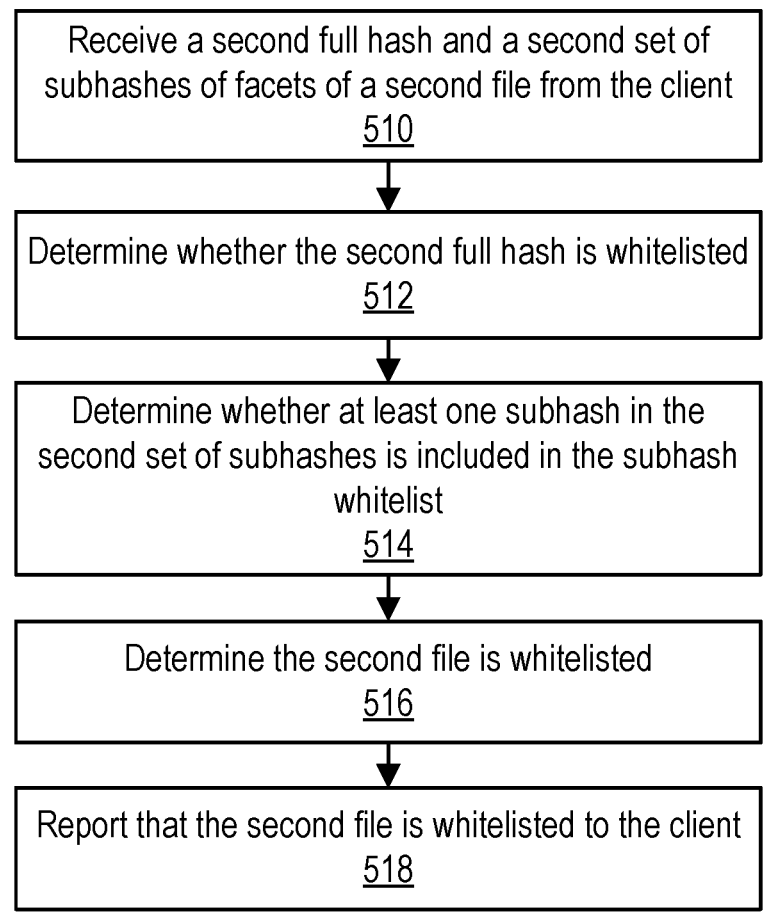
FIG. 5 is a flowchart illustrating an embodiment of a process for classifying files based on subhashes.

FIG. 5 is a flowchart illustrating an embodiment of a process 500 for classifying files based on subhashes. The security server 105 receives 510 a second full hash of a second file and a second set of subhashes of facets of the second file from a client 120. The security server 105 determines 512 whether the second full hash is whitelisted. If the second full hash is whitelisted, the security server 105 sends an indication to the protection application 136 that the file is whitelisted. Responsive to determining that the second full hash is not whitelisted, the security server 105 determines 514 whether at least one subhash in the second set of subhashes is included in the subhash whitelist. Responsive to determining 514 that at least one subhash in the second set of subhashes is included in the subhash whitelist, the security server 105 determines 516 that the second file is whitelisted and reports 518 that the second file is whitelisted to the client 120. Otherwise, the security server 105 reports that the second file does not match any whitelists (i.e., the file is unknown to the security server 105).

In an embodiment, the security server 105 checks whether at least one of the subhashes in the second set of subhashes is included in a subhash blacklist. If the security server 105 determines that at least one of the subhashes in the second set of subhashes is included in the subhash blacklist, the security server 105 classifies the second file as malicious, regardless of how many of the subhashes in the second set of subhashes are in the subhash whitelist.

In an embodiment, the security server 105 determines that the first full hash is malicious, and increments, for each subhash in the first set of subhashes, an associated malicious count. The security server 105 may add subhashes with nonzero malicious counts to the subhash blacklist, if there is a subhash blacklist, and remove such subhashes from the subhash whitelist.

The above-described system and processes beneficially enable reliable detection and remediation of malware. By relying on facets based on non-code portions of files to whitelist the files, the security server 105 can classify files with a reduced rate of false positives.

The present disclosure refers to embodiments using full hashes, though the techniques described herein additionally apply to full files that are not hashed and whitelists and/or blacklists of full files that are not hashed. In such alternative embodiments, the security server 105 maintains whitelists and/or blacklists of full files that are not hashed, and matches full files received from the client 120 against the whitelists and/or blacklists.

The present disclosure refers to embodiments using subhashes and subhash whitelists and/or blacklists, though the techniques described herein additionally apply to facets that are not hashed and whitelists and/or blacklists of facets that are not hashed. In such alternative embodiments, the security server 105 maintains whitelists and/or blacklists of facets that are not hashed, and matches facets received from the client 120 against the whitelists and/or blacklists.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method comprising:
    receiving a first full hash and a first plurality of subhashes from a client, wherein the first full hash is a hash of an entire first file and each subhash in the first plurality of subhashes is a hash of a facet of the first file, wherein a file comprises a code portion and a non-code portion and a facet is at least part of the non-code portion of the file;
    determining whether the first full hash is whitelisted;
    responsive to determining the first full hash is whitelisted, updating, for each subhash in the first plurality of subhashes, an associated clean count, wherein the clean count tracks a historic number of whitelisted files with which the subhash is associated;

responsive to a first clean count of the clean counts exceeding a threshold clean count, adding the subhash associated with the first clean count to a subhash whitelist;

receiving a second full hash and a second plurality of subhashes from the client, wherein the second full hash is a hash of an entire second file and each subhash in the second plurality of subhashes is a hash of a facet of the second file;

determining whether the second full hash is whitelisted;

responsive to determining the second full hash is not whitelisted, determining whether a subhash in the second plurality of subhashes is included in the subhash whitelist;

responsive to determining a subhash in the second plurality of subhashes is included in the subhash whitelist, determining the second file is whitelisted; and reporting that the second file is whitelisted to the client.

2. The method of claim 1, further comprising:
receiving a third plurality of subhashes from the client, wherein each subhash in the third plurality of subhashes is a hash of a facet of a third file;
determining that the third file is malicious; and
removing a subhash in the third plurality of subhashes from the subhash whitelist.

3. The method of claim 2, further comprising:
responsive to determining that the third file is malicious, incrementing, for each subhash in the third plurality of subhashes, an associated malicious count;
wherein removing the subhash in the third plurality of subhashes from the subhash whitelist is responsive to a malicious count associated with the subhash in the third plurality of subhashes comprising a nonzero value.

4. The method of claim 1, further comprising:
receiving a third plurality of subhashes of facets of a third file from a second client;
determining whether at least one subhash in the third plurality of subhashes is included in the subhash whitelist, comprising:
determining whether a subhash in the third plurality of subhashes is the subhash associated with the first clean count; and
reporting a result of determining whether at least one subhash in the third plurality of subhashes is included in the subhash whitelist to the second client.

5. The method of claim 1, further comprising:
receiving a third plurality of subhashes from the client, wherein each subhash in the third plurality of subhashes is a hash of a facet of a third file;
determining whether at least one subhash in the third plurality of subhashes is included in a subhash blacklist; and
responsive to determining at least one subhash included in the third plurality of subhashes is included in the subhash blacklist, reporting that the third file is malicious to the client.

6. The method of claim 1, wherein reporting that the second file is whitelisted to the client comprises reporting that the second file is whitelisted to a protection application at the client.

7. The method of claim 1, wherein the threshold clean count is five.

8. A non-transitory computer-readable storage medium storing computer program instructions executable by a processor to perform operations comprising:
receiving a first full hash and a first plurality of subhashes from a client, wherein the first full hash is a hash of an entire first file and each subhash in the first plurality of subhashes is a hash of a facet of the first file, wherein a file comprises a code portion and a non-code portion and a facet is at least part of the non-code portion of the file;

determining whether the first full hash is whitelisted;

responsive to determining the first full hash is whitelisted, updating, for each subhash in the first plurality of subhashes, an associated clean count, wherein the clean count tracks a historic number of whitelisted files with which the subhash is associated;

responsive to a first clean count of the clean counts exceeding a threshold clean count, adding the subhash associated with the first clean count to a subhash whitelist;

receiving a second full hash and a second plurality of subhashes from the client, wherein the second full hash is a hash of an entire second file and each subhash in the second plurality of subhashes is a hash of a facet of the second file;

determining whether the second full hash is whitelisted;

responsive to determining the second full hash is not whitelisted, determining whether a subhash in the second plurality of subhashes is included in the subhash whitelist;

responsive to determining a subhash in the second plurality of subhashes is included in the subhash whitelist, determining the second file is whitelisted; and reporting that the second file is whitelisted to the client.

9. The non-transitory computer-readable storage medium of claim 8, the operations further comprising:
receiving a third plurality of subhashes from the client, wherein each subhash in the third plurality of subhashes is a hash of a facet of a third file;
determining that the third file is malicious; and
removing a subhash in the third plurality of subhashes from the subhash whitelist.

10. The non-transitory computer-readable storage medium of claim 9, the operations further comprising:
responsive to determining that the third file is malicious, incrementing, for each subhash in the third plurality of subhashes, an associated malicious count;
wherein removing the subhash in the third plurality of subhashes from the subhash whitelist is responsive to a malicious count associated with the subhash in the third plurality of subhashes comprising a nonzero value.

11. The non-transitory computer-readable storage medium of claim 8, the operations further comprising:
receiving a third plurality of subhashes of facets of a third file from a second client;
determining whether at least one subhash in the third plurality of subhashes is included in the subhash whitelist, comprising:
determining whether a subhash in the third plurality of subhashes is the subhash associated with the first clean count; and
reporting a result of determining whether at least one subhash in the third plurality of subhashes is included in the subhash whitelist to the second client.

12. The non-transitory computer-readable storage medium of claim 8, the operations further comprising:
receiving a third plurality of subhashes from the client, wherein each subhash in the third plurality of subhashes is a hash of a facet of a third file;
determining whether at least one subhash in the third plurality of subhashes is included in a subhash blacklist; and responsive to determining at least one subhash included in the third plurality of subhashes is included in the subhash blacklist, reporting that the third file is malicious to the client.

13. The non-transitory computer-readable storage medium of claim 8, wherein reporting that the second file is whitelisted to the client comprises reporting that the second file is whitelisted to a protection application at the client.

14. The non-transitory computer-readable storage medium of claim 8, wherein the threshold clean count is five.

15. A system, comprising:
a processor; and
a non-transitory computer-readable storage medium storing computer program instructions executable by the processor to perform operations comprising:
receiving a first full hash and a first plurality of subhashes from a client, wherein the first full hash is a hash of an entire first file and each subhash in the first plurality of subhashes is a hash of a facet of the first file, wherein a file comprises a code portion and a non-code portion and a facet is at least part of the non-code portion of the file;
determining whether the first full hash is whitelisted;
responsive to determining the first full hash is whitelisted, updating, for each subhash in the first plurality of subhashes, an associated clean count, wherein the clean count tracks a historic number of whitelisted files with which the subhash is associated;
responsive to a first clean count of the clean counts exceeding a threshold clean count, adding the subhash associated with the first clean count to a subhash whitelist;
receiving a second full hash and a second plurality of subhashes from the client, wherein the second full hash is a hash of a second file and each subhash in the second plurality of subhashes is a hash of a facet of the second file;
determining whether the second full hash is whitelisted;
responsive to determining the second full hash is not whitelisted, determining whether a subhash in the second plurality of subhashes is included in the subhash whitelist;
responsive to determining a subhash in the second plurality of subhashes is included in the subhash whitelist, determining the second file is whitelisted; and
reporting that the second file is whitelisted to the client.

16. The system of claim 15, the operations further comprising:
receiving a third plurality of subhashes from the client, wherein each subhash in the third plurality of subhashes is a hash of a facet of a third file;
determining that the third file is malicious; and
removing a subhash in the third plurality of subhashes from the subhash whitelist.

17. The system of claim 16, the operations further comprising:
responsive to determining that the third file is malicious, incrementing, for each subhash in the third plurality of subhashes, an associated malicious count;
wherein removing the subhash in the third plurality of subhashes from the subhash whitelist is responsive to a malicious count associated with the subhash in the third plurality of subhashes comprising a nonzero value.

18. The system of claim 15, the operations further comprising:
receiving a third plurality of subhashes of facets of a third file from a second client;
determining whether at least one subhash in the third plurality of subhashes is included in the subhash whitelist, comprising:
determining whether a subhash in the third plurality of subhashes is the subhash associated with the first clean count; and
reporting a result of determining whether at least one subhash in the third plurality of subhashes is included in the subhash whitelist to the second client.

19. The system of claim 15, the operations further comprising:
receiving a third plurality of subhashes from the client, wherein each subhash in the third plurality of subhashes is a hash of a facet of a third file;
determining whether at least one subhash in the third plurality of subhashes is included in a subhash blacklist; and
responsive to determining at least one subhash included in the third plurality of subhashes is included in the subhash blacklist, reporting that the third file is malicious to the client.

20. The system of claim 15, wherein reporting that the second file is whitelisted to the client comprises reporting that the second file is whitelisted to a protection application at the client.

* * * * *